United States Patent [19]

Yates, III et al.

[11] Patent Number: 5,008,333

[45] Date of Patent: Apr. 16, 1991

[54] COMPATIBLE POLYPHENYLENE ETHER-LINEAR POLYESTER BLENDS HAVING IMPROVED IMPACT STRENGTH

[75] Inventors: John B. Yates, III, Glenmont; Gim F. Lee, Jr., Albany, both of N.Y.

[73] Assignee: General Electric Co., Selkirk, N.Y.

[21] Appl. No.: 206,248

[22] Filed: Jun. 13, 1988

[51] Int. Cl.$^5$ .................... C08L 53/02; C08L 71/12
[52] U.S. Cl. ........................................ 525/92; 525/67; 525/68; 525/132; 525/133; 525/146; 525/152; 525/905
[58] Field of Search .................. 525/67, 92, 905, 68, 525/133, 146, 152, 132

[56] References Cited

U.S. PATENT DOCUMENTS

| | | | |
|---|---|---|---|
| 4,123,410 | 10/1978 | Lee, Jr. | 525/92 |
| 4,491,649 | 1/1985 | Falk et al. | 525/92 |
| 4,672,086 | 6/1987 | Seiler et al. | 524/508 |

*Primary Examiner*—Jacob Ziegler
*Attorney, Agent, or Firm*—Francis T. Coppa

[57] ABSTRACT

Thermoplastic blends having excellent chemical resistance and improved impact strength are prepared from a polyphenylene ether, a linear polyester such as poly(alkylene dicarboxylate), a polymer containing a substantial proportion or aromatic polycarbonate units, and property improving amounts of an alkylene acrylate copolymer.

13 Claims, No Drawings

COMPATIBLE POLYPHENYLENE ETHER-LINEAR POLYESTER BLENDS HAVING IMPROVED IMPACT STRENGTH

FIELD OF THE INVENTION

This invention relates to novel resinous compositions of compatible polyphenylene ether-linear polyester blends containing an alkylene acrylate copolymer which offer solvent resistance and improved impact strength in molded parts.

BACKGROUND OF THE INVENTION

Polyphenylene ethers are a widely-used class of thermoplastic engineering resins characterized by excellent hydrolytic stability, dimensional stability, toughness, heat resistance and dielectric properties. They are also resistant to high temperature conditions under many circumstances.

A disadvantage of polyphenylene ethers which militates against their use in certain applications and particularly certain automotive applications is their low resistance to non-polar solvents such as gasoline. In several copending applications which will be described in greater detail below, highly compatible polymer blends of polyphenylene ether and linear polyester resins provide beneficial improvements in the chemical resistance required for automotive applications. Such automotive applications include molded thermoplastic body panels.

However, chemical resistance is not the only important physical property of such thermoplastic blends. In particular, for certain automotive applications, it is desirable that the molded thermoplastic product exhibit improved impact strength. As will be seen in the examples below, this goal is accomplished without unreasonably sacrificing other physical properties of the thermoplastic resin.

In co-pending commonly-owned application, Ser. No. 891,457 filed July 29, 1986, there are disclosed highly compatible polymer blends having a high degree of impact resistance and solvent resistance. These blends comprise at least one polyphenylene ether or blend thereof with at least one polystyrene, at least one poly(alkylene dicarboxylate), at least one elastomeric polyphenylene ether-compatible impact modifier, and at least one polymer containing a substantial proportion of aromatic polycarbonate units. Illustrative of the linear polyesters are the poly(alkylene dicarboxylates) and especially the poly(alkylene terephthalates). In copending, commonly owned application, Ser. No. 010,867 filed Feb. 4, 1987, there are disclosed similar polymer blends which are highly compatible and have high solvent resistance and favorable tensile properties but which are particularly useful in applications where impact strength is not the primary consideration.

Filled versions of compatible polyphenylene ether-polyester blends having good surface appearance and coefficients of thermal expansion can be seen in copending commonly owned applications Ser. No. 085,034, Filed Aug. 12, 1987 and Ser. No. 031,344, Filed Mar. 26, 1987. A glass and phosphorous compound blend of PPE and polyester may be seen in U.S. Pat. No. 4,672,086 (Seilers, et al.).

The use of olefin-acrylate copolymers as modifiers in polyphenylene ether-polyamide systems may be seen in copending application Ser. No. 122,954, Filed Mar. 26, 1987.

The improvements in impact strength found in compositions of the present invention are accomplished by incorporation of effective property improving amounts of alkylene acrylate copolymers, including functionalized versions thereof, in the polyphenylene ether - linear polyester base resin composition.

SUMMARY OF THE INVENTION

In one of its embodiments, the present invention is directed to a composition comprising the following components and any reaction products thereof, all percentage proportions being by weight of total resinous components:

A. about 15 to about 50% of at least one polyphenylene ether resin or blend thereof with at least one polystyrene resin;

B. about 20 to about 80% of at least one polyalkylene dicarboxylate, the weight ratio of component A to component B being at most 1.2 :1; and C. about 3 to about 50% of at least one polymer containing a substantial proportion of aromatic polycarbonate units and having a weight average molecular weight of at least about 40,000 as determined by gel permeation chromatography relative to polystyrene, or a blend thereof with a styrene homopolymer;

D. about 1 to about 15% of at least one impact modifier which is compatible with component A., the polyphenylene ether resin component.

E. an impact property improving amount, up to about 50 parts and generally 1 to 30 parts by weight per 100 parts of the foregoing resinous materials of an alkylene acrylate copolymer. Preferred compositions will contain about 1 to 8 parts of the alkylene based copolymer.

Incorporation of such olefinic additives have been found to be effective for improving the impact strength of the resinous molding composition while providing molded parts having excellent chemical resistance.

The olefin based copolymer useful in the practice of the current invention is an alkylene acrylate copolymer.

The olefin segment of the copolymer has the general formula

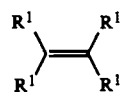

wherein each $R^1$ may independently be hydrogen or a monovalent hydrocarbon radical, particularly a lower alkyl radical of about one to eight carbon atoms, but may also be a halogen or cyano radical, or the like. In preferred embodiments $R^1$ is hydrogen and the olefin segment is therefore ethylene. Typically, the alkylene segment will have 2 to 6 carbon atoms.

The acrylate segment, which encompasses alkyl acrylates and acrylic acids as well, has the general formula

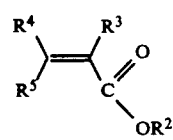

wherein each of $R^2$, $R^3$, $R^4$, and $R^5$ is independently, hydrogen or a monovalent hydrocarbon radical particularly a $C_1$ to $C_8$ alkyl radical.

Where the olefin segment is ethylene and $R^2$ is methyl and each of $R^3$, $R^4$ and $R^5$ is hydrogen, the alkylene acrylate copolymer is ethylene methyl acrylate. Additional specific copolymers are discussed in detail below.

Also encompassed herein are alkylene acrylate copolymers with functional groups, whereby functional groups have been introduced either by a polymerization reaction while forming a copolymer or by a grafting reaction, the functional group being selected from carboxylic acid, acid anhydride groups, acid amide groups, imido groups, carboxylic acid ester groups, amino groups, hydroxyl groups or epoxy groups.

It is not certain whether any or all of the components in these compositions intereact chemically upon blending. Therefore, the invention includes compositions comprising said components and any reaction products thereof as well as other optional components described hereafter.

DETAILED DESCRIPTION

The polyphenylene ethers (also known as polyphenylene oxides) used as all or part of component A in the present invention comprise a plurality of structural units having the formula

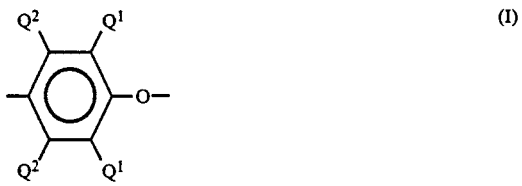

(I)

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohyrocarbonoxy as defined for $Q^1$. Examples of suitable primary lower alkyl groups are methyl, ethyl n-propyl, n-butyl, isobutyl, n-amyl, isoamyl, 2-methyl-butyl,n-hexyl, 2,3-dimethylbutyl, 2-,3- or 4-methyl-butyl, n-hexyl, 2,3-dimethylbuty1,2-,3- or 4-methyl-pentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agents reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinone, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.15–0.6 and preferably at least 0.25 dl./g., as measured in chloroform at 25 degrees centigrade.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874; 3,306,875; 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic alkdehydes, o-hydroxyazo compounds, w-hydroxyoximes (monomeric and polymeric), o-hydroxyaryl oximes an B-diketones. Also useful are known in the art by reason of disclosure in numerous patents and publications.

The polyphenylene ethers which may be used in the invention include those which comprise molecules having at least one of the end groups of the formulas

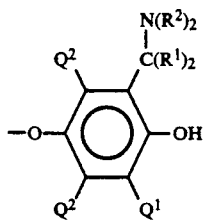 (II)

and

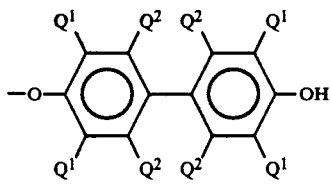 (III)

wherein $Q^1$ and $Q^2$ are as previously defined; each R is independently hydrogen or alkyl, with the proviso that the total number of carbon atoms in both $R^1$ radicals is 6 or less; and each $R^2$ is independently hydrogen or a $C_{1-6}$ alkyl radical. Preferably, each $R^1$ is hydrogen and each $R^2$ is alkyl, especially methyl or n-butyl.

Polymers containing the end groups of formula II (hereinafter "aminoalkyl end groups") may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethyl-amine, frequently become chemically bound to the polyphenylene ether, most often by replacing one of the alpha-hydrogen atoms in one or more $Q^1$ radicals. The principal site of reaction is the $Q^1$ radical adjacent to the hydroxy group on the terminal unit of the polymer chain. During further processing and/or blending, the aminoalkyl end groups may undergo various reactions, probably involving a quinone methide-type intermediate of the formula

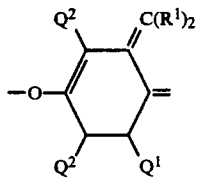 (IV)

with numerous beneficial effects often including an increase in impact strength and compatibilization with other blend components. Reference is made to U.S. Pat. Nos. 4,054,553; 4,092,294; 4,477,649; 4,477,651; and 4,517,341, the disclosures of which are incorporated by reference herein.

Polymers with 4-hydroxybiphenyl end groups of formula III are typically obtained from reaction mixtures in which a by-product diphenoquinone of the formula

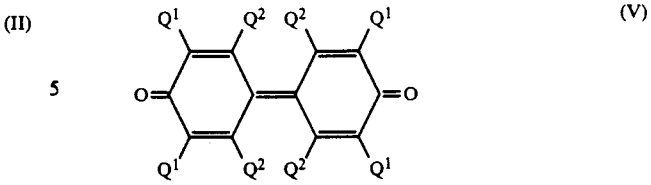 (V)

is present, especially in a copper-halide-secondary or tertiary amine system In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in the present invention include all those presently known, irrespective of variations in structural units or ancillary chemical features.

The use of polyphenylene ethers containing substantial amounts of unneutralized amino nitrogen may, under certain condition,, afford compositions with undesirably low impact strengths. The possible reasons for this are explained hereinafter. The amino compounds include, in addition to the aminoalkyl end groups, traces of amine (particularly secondary amine) in the catalyst used to form the polyphenylene ether.

It has further been found that the properties of the compositions can often be improved in several respects, particularly impact strength, by removing or inactivating a substantial proportion of the amino compounds in the polyphenylene ether. Polymers so treated are sometimes referred to hereinafter as "inactivated polyphenylene ethers". They preferably contain unneutralized amino nitrogen, if any, in amounts no greater than 800 parts per million (ppm) and more preferably in the range of about 200 to 800 ppm. Various means for inactivation have been developed and any one or more thereof may be used.

One such method is to precompound the polyphenylene ether with at least one compound containing a carboxylic aid, acid anhydride or ester group, which is capable of neutralizing the amine compounds. Illustrative acids, anhydrides and esters are citric acid, malic acid, succinic acid, succinic anhydride, maleic acid, maleic anhydride, citraconic acid, citraconic anhydride, itaconic acid, itaconic anhydride, itaconic fumarate. Because of their relatively high reactivity with amino compounds, the free carboxylic acids and especially fumaric acid are generally most useful.

Reaction of the polyphenylene ether with the acid or anhydride may be achieved by heating at a temperature within the range of about 230 to 390 degrees centigrade, in solution or preferably in the melt. In general, about 0.3 to 2.0 and preferably about 0.5 to 1.5 parts (by weight) of acid or anhydride is employed per 100 parts of polyphenylene ether. Said reaction may conveniently be carried out in an extruder or similar equipment.

Another method of inactivation is by extrusion of the polyphenylene ether under the above-described conditions with vacuum venting. This may be achieved either in a preliminary extrusion step (which is sometimes preferred) or during extrusion of the composition of this invention, by connecting the vent of the extruder to a vacuum pump capable of reducing the pressure to about 20 torr or less.

It is believed that these inactivation methods aid in the removal by evaporation or the neutralization of any traces of free amines (predominantly secondary amines) in the polymer, including amines generated by conversion of aminoalkyl end groups to quinone methides of the type represented by formula IV. Polyphenylene ethers having a free amine nitrogen content below about 800 ppm have been found particularly useful in this invention. However, the invention is not dependent on any theory of inactivation.

The preparation of inactivated polyphenylene ethers by reaction with acids or anhydrides, together with vacuum venting during extrusion, is illustrated by the following exemplary procedure. All parts in the examples herein are by weight.

Preparation of Inactivated PPE

A mixture of 1.43 parts of maleic anhydride and 100 parts of a poly(2,6-dimethyl-1,4-phenylene ether) having a number average molecular weight (as determined by gel permeation chromatography) of about 20,000 and an intrinsic viscosity in chloroform at 25 degrees centigrade of 0.46 dl/g can be tumble-mixed for 15 to 30 minutes and then extruded on a 30 mm twin screw extruder at 400 rpm over a temperature range of about 310 to 325 degrees centigrade. The feed rate of the mixture may be maintained at about 524 grams per 10 minutes. The extruder may be vacuum vented with a vacuum pump to a pressure less than 20 torr during the extrusion. The product is an inactivated polyphenylene ether.

When the procedure of the foregoing preparation is repeated, substituting 0.7 and 1.4 parts (respectively) of fumaric acid for the maleic anhydride and extruding over a temperature range of about 300 to 325 degrees centigrade, similar products are obtained. And when the preparation is repeated, substituting 0.7 part of citric acid for the fumaric acid, again, a similar product is obtained.

An art-recognized means for improving processability of polyphenylene ethers is to blend the polyphenylene ether with a polystyrene resin. Thus, it is within the scope of the invention for component A to contain at least one polystyrene.

The term "polystyrene" as used herein includes polymers prepared by methods known in the art including bulk, suspension and emulsion polymerization, which contain at least 25% by weight of structural units derived from a monomer of the formula

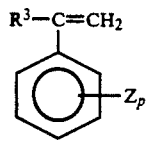   (VI)

wherein $R^3$ is hydrogen, lower alkyl or hologen; Z is vinyl, halogen or lower alkyl; and p is from 0 to 5.

These resins include homopolymers of styrene, chlorostyrene and vinyl toluene, random copolymers of styrene with one or more monomers illustrated by acrylonitrile, butadiene, alpha-methylstyrene, ethylvinylbenzene, divinylbenzene and maleic anhydride, and rubber modified polystyrenes comprising blends and grafts wherein the rubber is a polybutadiene or a rubber copolymer of about 98–70% styrene and about 2–30% diene monomer. These rubber-modified polystyrenes include high impact polystyrene, or HIPS. Other saturated and unsaturated rubbers may be utilized to modify the polystyrene. Another high impact styrene is EPDM HIPS.

The proportion of polystyrene in component A is not critical, since polyphenylene ethers and polystyrenes are generally miscible in all proportions. Component A will generally contain about 5 to 50% (by weight) polystyrene, if any.

Component B is at least one linear polyester. The linear polyesters include thermoplastic poly(alkylene dicarboxylates) and alicyclic analogs thereof. They typically comprise structural units of the formula

   (VII)

wherein $R^4$ is a saturated divalent aliphatic or alicyclic hydrocarbon radical containing about 2 to 10 and usually about 2 to 8 carbon atoms and $A^1$ is a divalent aromatic radical containing about 6 to 20 carbon atoms. They are ordinarily prepared by the reaction of at least one diol such as ethylene glycol, 1,4-butanediol or 1,4-cyclohexanedimethanol with at least one aromatic dicarboxylic acid such as isophthalic or terephthalic acid, or lower alkyl ester thereof. The polyalkylene terephthalates, particularly, polyethylene and polybutylene terephthalate, are preferred. Such polyesters are known in the art as illustrated by the following patents:

| | |
|---|---|
| 2,465,319 | 3,047,539 |
| 2,720,502 | 3,671,487 |
| 2,727,881 | 3,953,394 |
| 2,822,348 | 4,128,526 |

Because of the tendency of polyesters to undergo hydrolytic degradation at the high extrusion and molding temperatures encountered by the compositions of this invention, it is preferred that the polyester used as component B be substantially free of water.

The polyesters generally have number average molecular weights in the range of about 20,000 to 70,000, as determined by intrinsic viscosity (IV) at 30 degrees centigrade in a mixture of 60% (by weight) phenol and 40% 1,1,2,2-tetrachloroethane. When resistance to heat distortion is an important factor, the polyester molecular weight should be relatively high, typically above about 40,000.

Because of the presence of both poly(alkylene dicarboxylates) and polymers containing carbonate units in the compositions of this invention, there is a possibility for ester-carbonate exchange resulting in degradation of one or both polymers, particularly at high molding temperatures. It is, therefore, sometimes preferred to incorporate in the compositions an agent which suppresses such exchange, typically in the amount of about 0.01 to 7.5% by weight of total polyester. It is generally preferred to precompound said exchange suppressing agent with the polyester. Precompounding may be achieved by direct blending or by forming a concentrate, typically with about 1 to 25% by weight of the polyester, and adding said concentrate to the remaining portion thereof.

Illustrative exchange suppressing agents are hydroxyaromatic compounds such as the hydroxybenzophenones disclosed in U.S. Pat. No. 4,452,932; salicylate compounds such as methyl salicylate, disclosed in U.S. Pat. No. 4,452,933; and sodium and potassium dihydrogen phosphates disclosed in U.S. Pat. No. 4,532,290. The disclosures of all of the foregoing patents relating to polyesters are also incorporated by reference herein.

According to the present invention, the tendency of blends of components A and B to be incompatible is overcome by incorporating component C in the composition. The essential ingredient of component C is a polymer containing a substantial proportion of aromatic polycarbonate units.

Among the preferred polymers of this type are the aromatic polycarbonate homopolymers. The structural units in such homopolymers generally have the formula

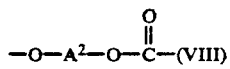

wherein $A^2$ is an aromatic radical. Suitable $A^2$ values include m-phenylene, p-phenylene, 4,4'-biphenylene, 2,2-bis(4-phenylene) propane, 2,2-bis(3,5-dimethyl-4-phenylene)propane and similar radicals such as those which correspond to the dihydroxyaromatic compounds disclosed by name or formula (generic or specific) in U.S. Pat. No. 4,217,438. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $A^2$ radicals are hydrocarbon radicals.

The $A^2$ radicals preferably have the formula $$-A^3-Y-A^4- \qquad (IX)$$

wherein each of $A^3$ and $A^4$ is a single-ring divalent aromatic radical and Y is a bridging radical in which one or two atoms separate $A^3$ from $A^4$. The free valence bonds in formula IX are usually in the meta or para positions of $A^3$ and $A^4$ in relation to Y. Such $A^2$ values may be considered as being derived from bisphenols of the formula $HO-A^3-Y-A^4OH$. Frequent reference to bisphenols will be made hereinafter, but it should be understood that $A^2$ values derived from suitable compounds other than bisphenols may be employed as appropriate.

In formula IX, the $A^3$ and $A^4$ values may be unsubstituted phenylene or substitute derivatives thereof, illustrative substituents (one or more) being alkyl, alkenyl (e.g., crosslinkable-graftable moieties such as vinyl and allyl), halo (especially chloro and/or bromo), nitro, alkoxy and the like. Unsubstituted phenylene radicals are preferred. Both $A^3$ and $A^4$ are preferably p-phenylene, although both may be o- or m-phenylene or one o- or m-phenylene and the other p-phenylene.

The bridging radical, Y, is one in which one or two atoms, preferably one, separate $A^3$ from $A^4$. It is most often a hydrocarbon radical and particularly a saturated radical such as methylene, cylohexyl-methylene, 2-[2.2.1]-bicycloheptylmethylene, ethylene, 2,2-propylene, 1,1-(2,2-dimethylpropylene), 1,1-cyclohexylene, 1,1-cyclopentadecylene, 1,1-cyclododecylene or 2,2-adamantylene, especially a gem-alkylene radical. Also included, however, are unsaturated radicals and radicals which are entirely or partially composed of atoms other than carbon and hydrogen. Examples of such radicals are 2,2-dichloroethylidene, carbonyl, thio and sulfone. For reasons of availability and particular suitability for the purposes of this invention, the preferred radical of formula VIII is the 2,2-bis-(4-phenylene)propane radical, which is derived from bisphenol A and in which Y is isopropylidene and $A^3$ and $A^4$ are each -phenylene.

Various methods of preparing polycarbonate homopolymers are known, and any of them may be used for preparing component C. They include interfacial and other methods in which phosgene is reacted with bisphenols, transesterification methods in which bisphenols are reacted with diaryl carbonates, and methods involving conversion of cyclic polycarbonate oligomers to linear polycarbonates. The latter method is disclosed in U.S. Pat. No. 4,605,731, European Patent Application 162,379 and U.S. Pat. No. 4,644,053.

Various copolycarbonates are also useful as component C. One example thereof is the polyester-polycarbonates of the type obtained by the reaction of at least one dihydroxyaromatic compound with a mixture of phosgene and at least one dicarboxylic acid chloride, especially isophthaloyl chloride, terephthaloyl chloride or both. Such polyester-polycarbonates contain structural units of formula VIII combined with units of the formula

$A^5$ is an aromatic and usually a p- or m-phenylene radical. Other examples are the siloxane-carbonate block copolymers disclosed, for example, in U.S. Pat. Nos. 3,189,662 and 3,419,634 and the polyphenylene ether-polycarbonate block copolymers of U.S. Pat. Nos. 4,374,223 and 4,436,876 which frequently provide compositions with substantially higher heat distortion temperatures than those containing homopolycarbonates. The disclosures of the patents and applications listed above relating to polycarbonates and copolycarbonates are also incorporated by reference herein.

The copolycarbonates should, for the most part, contain at least about 20% by weight of carbonate structural units. When the copolymeric units are other than ester units, the polymer preferably contains at o least about 45% carbonate units.

The weight average molecular weight of the homo- or copolycarbonate should be at least about 40,000 (as determined by gel permeation chromatography relative to polystyrene). It is most often in the range of about 40,000 to 80,000 and especially about 50,000 to 80,000. However, compositions in which component C has a molecular weight in the range of about 80,000 to 200,000 often have favorable properties.

In most instances, component C consists of the polycarbonate or copolycarbonate; that is, said polymer is the entire component except for impurities. It is within the scope of the invention, however, to use as component C a blend of a polycarbonate or polyester-polycarbonate with a styrene homopolymer, typically having a number average molecular weight of about 50,000-250,000. Such blends generally contain at least 50% of the polycarbonate or polyester-polycarbonate.

It will be noted that various polystyrenes may be different. The polystyrene in component A is generally a homopolymer, random copolymer or rubber-modified polystyrene, and homopolymers are used in component C. Moreover, polystyrenes are ordinarily present in only one of components A and C, if in either.

It is also within the scope of the invention to employ a polyester-aromatic polycarbonate blend as a source of part or all of components B and C. The use of such a blend may provide somewhat more flexibility in component proportions.

Particularly in compositions containing inactivated polyphenylene ethers and relatively small amounts of polycarbonate it is frequently found that resistance to heat distortion is improved if there is also blended into the composition at least one compound selected from those containing at least one cyanurate or isocyanurate moiety and those containing a plurality of epoxide moieties. Illustrative cyanurates and isocyanurates are cyanuric chloride, triethyl cyanurate, triallyl cyanurate, triallyl isocyanurate and triphenyl cyanurate. Epoxide compounds include homopolymers of such compounds as glycidyl acrylate and glycidyl methacrylate, as well as copolymers thereof, preferred comonomers being lower alkyl acrylates, methyl methacrylate, acrylonitrile and styrene. Also useful are epoxy-substituted cyanurates and isocyanurates such as triglycidyl isocyanurate.

Compositions of the invention are further comprised of component D which is at least one elastomeric impact modifier which is compatible with component A, the polyphenylene ether and optional alkenyl aromatic polymer. Suitable impact modifiers include various elastomeric copolymers, of which examples are ethylene-propylene-diene polymers (EPDM's), both unfunctionalized and functionalized with (for example) sulfonate or phosphonate groups; carboxylated ethylene-propylene rubbers; copolymers (usually block or graft) or alkenylaromatic compounds such as styrene and/or epoxy compounds such as glycidyl methacrylate with polymerizable olefins or dienes, including butadiene, isoprene, chlorprene, ethylene, propylene and butylene; and core-shell elastomers containing, for example, a poly(alkyl acrylate) core attached to a polystyrene shell via an interpenetrating network. Such core-shell elastomers are more fully disclosed in co-pending, commonly owned application Ser. No. 811,800, filed Dec. 20, 1985. Optional modifiers which are known to improve the impact strength of components B or C may also be utilized in certain applications.

The preferred impact modifiers are block (typically diblock, triblock or radial teleblock) copolymers of alkenylaromatic compounds and olefins or dienes. Most often, at least one block is derived from styrene and at least one other block from at least one of butadiene, isoprene, ethylene and butylene. Especially preferred are the triblock copolymers with polystyrene end blocks and olefin- or diene-derived midblocks. When one of the blocks is derived from one or more dienes, it is frequently advantageous to reduce the aliphatic unsaturation therein by selective hydrogenation. The weight average molecular weights of the impact modifiers are typically in the range of about 50,000 to 300,000. Block copolymers of this type of commercially available from Shell Chemical Company under the trademark KRATON, and include KRATON D1101, G1650, G1651, G1652, G1657, and G1702.

The thermoplastic resin compositions provided in accordance with the present invention include an olefinic based agent as component E to improve the impact properties of the resin product. Particularly suitable for use in such compositions are:

Alkylene acrylate copolymers with an alkylene group having 2-6 carbon atoms and with an alkyl ester group having 1-8 carbon atoms. These compounds are disclosed, for example, in U.S. Pat. Nos. 3,700,751 and 3,845,163; both incorporated by reference. This type of polymer is prepared by copolymerizing an olefin, for example, ethylene or propylene, with one or more of the following monomers: a $C_1$-$C_8$ alkyl acrylate, for example, methyl acrylate, ethyl acrylate, hexyl acrylate and the like; a $C_1$-$C_8$ alkyl methacrylate, for example, methyl methacrylate, ethyl methacrylate, hexyl methacrylate and the like; acrylic acid or methacrylic acid. Preferred are copolymers of ethylene with an alkyl ester of acrylic acid. In general, the acrylate content or methacrylate content of the copolymer may be from approximately 10 to approximately 30% by weight. The olefin content of the copolymer may be from approximately 70 to approximately 90% by weight. An example of the last-mentioned copolymer is an ethylene-ethyl acrylate copolymer with a weight ratio of ethylene to ethyl acrylate of approximately 4.5 to 1.

Alkylene acrylate copolymers with a functional group, whereby the functional group has been introduced, for example, by a polymerization reaction while forming a copolymer or by a grafting reaction. The functional group may be selected from carboxylic acid groups, acid anhydride groups, acid amide groups, imido groups, carboxylic acid ester groups, amino groups, hydroxyl groups or epoxy groups. The alkylene group of the functionalized alkylene acrylate copolymer comprises 2-6 carbon atoms and the alkyl group thereof comprises 1-8 carbon atoms. This type of agent to improve impact resistance is described, for example, in U.S. Pat. Nos. 4,436,872 and 4,478,973. Suitable examples are ethylene-ethyl acrylate-maleic acid polymers and ethylene-ethyl acrylate-fumaric acid polymers. These polymers can also be obtained by complete or partial saponification of the above-mentioned non-functionalized alkylene acrylate copolymers. For this purpose reference may be made to U.S. Pat. No. 4,485,214. The above mentioned patents are incorporated by reference.

Of course it is possible to use a combination of one or more of the above-mentioned olefin-based copolymers to improve the impact resistance.

The chemical roles of the inactivated polyphenylene ether and any cyanurate or epoxide moiety which may be utilized in the compositions of this invention are not fully understood, and any reliance on chemical theory as a basis for the invention is specifically disclaimed. It is believed, however, that the presence of more than a certain minimum proportion of amino compounds in the polyphenylene ether can cause degradation in the molecular weight of the polycarbonate. Such amino compounds include, in addition to the aminoalkyl end groups, traces of amines (particularly secondary amine) in the catalyst used to form the polyphenylene ether. If this is true, the removal or neutralization of the greater part of such amino compounds produces an environment in which high molecular weight is maintained in the polycarbonate, thus maximizing its effect as a compatibilizing agent.

The preparation of the compositions of this invention is normally achieved by merely blending the ingredients thereof under conditions adapted for the formation of an intimate blend. Such conditions often include extrusion, which may be conveniently effected in a screw-type or similar extruder which applies a substantial shearing force to the composition, thereby decreasing the particle size thereof. The extrusion temperature is generally in the range of about 100 degrees to 325 degrees centigrade.

In one embodiment of the invention, a single extruder is employed which has at least two ports for introduction of ingredients, one such port being downstream from the other. Component A or any reactants for preparation thereof is introduced through the first port and extruded, preferably at a temperature in the range of about 300 to 350 degrees centigrade. This portion of the extruder is preferably vacuum vented.

The remaining ingredients are introduced through the downstream port and extrusion is continued, preferably at a lower temperature to minimize degradation of component B. Typical extrusion temperatures at this stage are in the range of about 260 to 320 degrees centigrade. The resin extrudate may be quenched in a water bath and pelletized by conventional means to provide the thermoplastic compositions of the invention.

In the following examples illustrating the invention, the blend constituents used were as follows:

Polyphenylene ether—a poly(2,6-dimethyl-1,4-phenylene ether) having a number average molecular weight of about 20,000 and an intrinsic viscosity in chloroform at 25 degrees centigrade of 0.40 dl./g; it contained about 1000 ppm nitrogen.

PET—a poly(ethylene terephthalate), recycled bottle grade resin having an intrinsic viscosity of about 0.52 was used. Bottle grades typically contain less than 5% diethylene glycol or isophthalic acid to reduce the rate of crystallization. Virgin grades of PET such as ICI Americas grade C-5920 having an intrinsic viscosity of 0.95 dl/gm can also be used.

PBT—a poly(butylene terephthalate) having a number average molecular weight, as determined by gel permeation chromatography, of about 50,000. Available commercially as VALOX® 315 resin.

Polycarbonate—bisphenol A homopolycarbonate prepared interfacially and having an intrinsic viscosity in chloroform of approximately 0.6 dl/g Available commercially as Lexan 130 Grade resin.

SEBS Elastomer—an A-B-A triblock copolymer of styrene-ethylene butylene-styrene known as KRATON G 1651 from Shell Chemical Co.

Core-Shell Impact Modifier—Acryloid KM653 also known as KM3607, available from Rhom & Haas.

High Impact Polystyrene—Huntsman 1897 rubber modified polystyrene resin.

EMA-ethylene-methyl acrylate copolymer. Chevron Chemical Co. PE 2205 having a methyl acrylate content of 20% by weight, and a melt flow index of 2.4 gm/10 min (ASTM D-1238).

EEA-MAH—ethylene-ethyl acrylate copolymer functionalized with maleic anhydride. Lotader 4700 grade having ethyl acrylate content of 30% and maleic anhydride content of 2% and a melt flow index of 7 gm/10 min. Available from CdF Chimie.

EAA-ethylene-acrylic acid copolymer having an acrylic acid content of about 6.5% and a melt flow index of 9.0 gm/10 min. Available as DOW Primacor 3340 grade.

EXAMPLES 1 to 3

Table 1 describes the compositions for several thermoplastic molding compositions provided in accordance with the present invention. The polyphenylene ether resin, the rubber modifier and the vinyl functional additive material were combined at the feed throat of a 30 mm Werner & Pfleiderer twin-screw extruder having a melt temperature ranging from approximately 550 F. to 650 F. A vacuum of approximately 20 inches Hg was applied to the melt. The remaining components, i.e., the polyalkylene terephthalate resin and the polycarbonate resin were added downstream from the vacuum where the melt temperature ranged from approximately 520 F. to 570 F. It should be noted that optional embodiments of the present invention can also have the rubber and vinyl functional additives added at this downstream addition part rather than at the initial feed-throat. This may be especially useful under circumstances where less temperature and shear conditions are desirable.

The extrudate was quenched and pelletized. The thermoplastic products were molded on a Toshiba injection molding machine (8 ounce barrel capacity) into test specimens. Physical properties are reported in Table 2. The abbreviations are defined as follows:

HDT: heat distortion temperature measured at 66 psi reported in degrees F.
NI: notched Izod reported in ft-lb/in of notch
DYN: Dynatup ® falling dart impact reported in ft-lb
  B indicates brittle failure
  D indicates ductile failure
  S indicates a split
FM: flexural modulus reported in psi
FS: flexural strength reported in psi
TY: tensile yield reported in psi
TS: tensile strength at break reported in psi T-elg: tensile elongation at break reported in %

TABLE 1

| Formulation (pbw) | A* | 1 | 2 | 3 |
|---|---|---|---|---|
| polyphenylene ether | 20 | 20 | 30 | 30 |
| high impact polystyrene | 10 | 10 | 0 | 0 |
| polycarbonate | 30 | 30 | 30 | 30 |
| S-EB-S rubber | 5 | 5 | 10 | 10 |
| poly(ethylene terephthalate) | 25 | 25 | 25 | 10 |
| poly(butylene terephthalate) | 0 | 0 | 25 | 10 |
| EMA | 0 | 5 | 0 | 0 |
| EAA | 0 | 0 | 0 | 3 |
| EEA-MAH | 0 | 0 | 3 | 0 |

*comparative example

TABLE 2

| Properties | A | 1 | 2 | 3 |
|---|---|---|---|---|
| heat distortion temperature (F.) | 275 | 276 | 278 | 280 |
| Notched Izod Impact (ft-lb/in) | 3.5 | 15.4 | 11.8 | 13.2 |
| Flexural Modulus (psi × 1000) | 311 | 278 | — | 257 |
| Flexural Strength | 12.1 | 10.6 | — | 10.7 |
| Tensile Yield (psi × 1000) | 6.5 | 7.1 | 6.4 | 7.0 |
| Tensile Elongation (% at break) | 43 | 26 | 41 | 44 |
| Dynatup Impact (ft-lb) | | | | |
| room temperature | 47 | 40 | 37 | 29 |
| mode of failure | D | D | D | D |
| −20 F. | 53 | 51 | 56 | 40 |

TABLE 2-continued

| Properties | A | 1 | 2 | 3 |
|---|---|---|---|---|
| mode of failure | B | B | B | B |

EXAMPLES 4-11

Tables 3 and 4 illustrate additional examples of formulations of the invention prepared in accordance with the procedure used above.

Examples 10 and 11 described in Table 5 were prepared in similar fashion and subjected to chemical resistance tests described below.

TABLE 3

| | Examples | | | | | |
|---|---|---|---|---|---|---|
| Formulation (pbw): | 4 | 5 | 6 | 7 | 8 | 9 |
| polyphenylene ether resin | 20 | 20 | 20 | 20 | 30 | 20 |
| polyethylene terephthalate resin | 37 | 25 | 25 | 25 | — | — |
| polybutylene terephthalate resin | — | — | — | — | 30 | 50 |
| polycarbonate resin | 20 | 30 | 30 | 30 | 30 | 20 |
| S-EB-S rubber | 5 | 5 | 8 | 5 | 5 | 5 |
| EMA | 3 | 3 | 4 | 3 | 3 | 3 |
| core-shell impact modifier | 8 | — | — | — | — | — |
| high impact polystyrene resin | 10 | 10 | 10 | 10 | — | — |

TABLE 4

| Properties | 4 | 5 | 6 | 7 | 8 | 9 |
|---|---|---|---|---|---|---|
| Notched Izod | 13.3 | 12.2 | 13.1 | 15.3 | 11.5 | 16.4 |
| Dynatup Impact | | | | | | |
| room temperature | 35D | 49D | 45D | 40D | 40D | 41D |
| −20 degrees F. | 50B | 51B | 47B | 49B | 38B | 42B |
| HDT 66 | 278 | 282 | 277 | 285 | 276 | 283 |
| Flexural Modulus (×1000) | 246 | 283 | 250 | 258 | 278 | 280 |
| Flexural Strength (×1000) | 9.6 | 11.3 | 10.1 | 10.6 | 11.2 | 11.0 |
| Tensile Yield (×1000) | 6.8 | 7.7 | 7.1 | 7.5 | 7.8 | 7.5 |
| Tensile Elongation (percent) | 50 | 64 | 30 | 24 | 41 | 57 |

TABLE 5

| | Example | |
|---|---|---|
| Formulation (pbw) | 10 | 11 |
| polyphenylene ether resin | 20 | 20 |
| high impact polystyrene | 10 | 10 |
| polycarbonate resin | 30 | 21 |
| S-EB-S rubber | 5 | 5 |
| poly(ethylene terephthalate) | 25 | 41 |
| EMA | 3 | 3 |
| Properties | | |
| tensile yield | 8149 | 7686 |
| tensile elongation @ yield | 9.5 | 9.3 |
| tensile elongation @ break | 136 | 142 |
| notched Izod | 4.5 | 3.8 |

Chemical resistance tests were performed on the compositions of Examples 10 and 11 in the following manner. Various liquid oils and detergents were applied to ASTM type V test parts, whereupon tensile properties were measured after three days exposure. The test pieces were placed in jigs which provided between 0 and 1.0 percent strain.

Tables 6 to 8 indicate the tensile properties for the various test parts.

TABLE 6

| | Alpha Keri Bath Oil TM | | | |
|---|---|---|---|---|
| | Example 10 | | Example 11 | |
| Strain % | Tensile Strength at Yield | Elongation at Yield | Tensile Strength at Yield | Elongation at Yield |
| control | 8149 | 9.5 | 7686 | 9.3 |
| 0% | 8143 | 9.9 | 7733 | 9.7 |
| 0.5% | 8203 | 10.3 | 7740 | 9.7 |
| 0.75% | 8183 | 10.9 | 7425 | 9.9 |
| 1.0% | 7834 | 9.3 | 7646 | 9.3 |

TABLE 7

| | Head & Shoulders TM | | | |
|---|---|---|---|---|
| | Example 10 | | Example 11 | |
| control | 8149 | 9.5 | 7686 | 9.3 |
| 0% | 8203 | 11.0 | 7814 | 9.7 |
| 0.5% | 8183 | 10.3 | 7854 | 9.3 |
| 0.75% | 8263 | 10.0 | 7747 | 9.5 |
| 1.0% | 8236 | 10.4 | 7787 | 9.3 |

TABLE 8

| | Lysol Basin, Tub & Tile Cleaner TM | | | |
|---|---|---|---|---|
| | Example 10 | | Example 11 | |
| control | 8149 | 9.5 | 7686 | 9.3 |
| 0% | 8330 | 10.0 | 7861 | 9.7 |
| 0.5% | 4163 | 6.0* | 3995 | 5.0* |
| 0.75% | 5592 | 7.4* | 4240 | 4.7* |
| 1.0% | 5338 | 6.6* | 3479 | 4.6* |

*denotes crazing observed

The foregoing Examples should not be construed as limiting the scope of the invention in any way. It is within the scope of the invention for the compositions to contain other conventional ingredients such as fillers, flame retardants, colorants, stabilizers, anti-static agents, mold release agents and the like. The presence of other resinous components up to about 15 parts per hundred weight resin (phr) is also contemplated. All of the above-mentioned patents and applications are hereby incorporated by reference.

What is claimed is:

1. A thermoplastic composition comprising: 100 parts by weight of the following resinous components and any reaction products thereof, all percentage proportions being by weight of total resinous components:
   (A) about 15 to 50% of at least one polyphenylene ether, or a blend thereof with at least one polystyrene;
   (B) about 20 to 80% of at least one poly(alkylene dicarboxylate), the weight ratio of component A to component B being at most 1.2:1;
   (C) from 3 to about 50% of at least one polymer containing a substantial proportion of aromatic polycarbonate units and having a weight average molecular weight of at least about 40,000 as determined by gel permeation chromatography relative to polystyrene, or a blend thereof with a styrene homopolymer; and
   (D) about 1 to about 15% of at least one elastomeric impact modifier which is compatible with component (A); and
   (E) about 1 to about 50 parts by weight of an alkylene acrylate copolymer per 100 parts of resinous components A through D.

2. A composition as in claim 1 wherein said alkylene acrylate copolymer is comprised of an alkylene group having 2 to 6 carbon atoms and an alkyl ester group having 1 to 8 carbon atoms.

3. A composition as in claim 2 wherein said alkylene acrylate copolymer is selected from the group consisting of ethylene methyl acrylate, ethylene-ethyl acrylate-maleic anhydride copolymer, and ethylene-acrylic acid copolymer.

4. A composition as in claim 1 wherein said alkylene acrylate copolymer is present in an amount of approximately 1.0 to 8 parts by weight per 100 parts by weight resinous components A through D.

5. A composition as in claim 1 wherein said polyphenylene ether is a poly-(2,6-dimethyl-1,4-phenylene ether).

6. A composition according to claim 1 wherein component B is a poly(ethylene terephthalate), poly(butylene terephthalate), or poly(1,3-cyclohexylene dimethylene terephthalate) and the polycarbonate units in component C are bisphenol A polycarbonate units.

7. A composition according to claim 6 wherein component B has a number average molecular weight in the range of about 20,000–70,000.

8. A composition according to claim 1 wherein the proportion of component A is about 20–40% that of component B is about 50–75% and that of component C is about 5–20%.

9. A composition according to claim 8 wherein component C is a polycarbonate homopolymer having a weight average molecular weight in the range of about 40,000–200,000.

10. A composition according to claim 8 wherein component C is a polyester-polycarbonate.

11. A composition according to claim 1 wherein said elastomeric impact modifier (D) is a triblock copolymer wherein the end blocks are derived from styrene and the midblock is derived from at least one of isoprene, butadiene, ethylene, and butylene.

12. An article of manufacture comprised of the thermoplastic composition of claim 1.

13. A thermoplastic composition consisting essentially of: 100 parts by weight of the following resinous components and any reaction products thereof, all percentage proportions being by weight of total resinous components:
(A) about 15 to 50% of at least one polyphenylene ether, or a blend thereof with at least one polystyrene;
(B) about 20 to 80% of at least one poly(alkylene dicarboxylate), the weight ratio of component A to component B being at most 1.2:1;
(C) from 3 to about 50% of at least one polymer containing a substantial proportion of aromatic polycarbonate units and having a weight average molecular weight of at least about 40,000 as determined by gel permeation chromatography relative to polystyrene, or a blend thereof with a styrene homopolymer; and
(D) about 1 to about 15% of at least one elastomeric impact modifier which is compatible with component (A); and
(E) about 1 to about 50 parts by weight of an alkylene acrylate copolymer per 100 parts of resinous components A through D.

* * * * *